(12) United States Patent
Sartori et al.

(10) Patent No.: US 12,075,430 B2
(45) Date of Patent: Aug. 27, 2024

(54) PROTECTION FOR MODE-3 V2X UES IN THE ITS BAND

(71) Applicant: Futurewei Technologies, Inc., Plano, TX (US)

(72) Inventors: Philippe Sartori, Plainfield, IL (US); Majid Ghanbarinejad, Chicago, IL (US); George Calcev, Hoffman Estates, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 130 days.

(21) Appl. No.: 17/397,746

(22) Filed: Aug. 9, 2021

(65) Prior Publication Data

US 2021/0368533 A1 Nov. 25, 2021

Related U.S. Application Data

(62) Division of application No. 15/989,755, filed on May 25, 2018, now Pat. No. 11,089,625.

(51) Int. Cl.
| | |
|---|---|
| *H04L 5/00* | (2006.01) |
| *H04W 72/12* | (2023.01) |
| *H04W 72/23* | (2023.01) |
| *H04W 4/40* | (2018.01) |
| *H04W 72/51* | (2023.01) |

(Continued)

(52) U.S. Cl.
CPC .......... *H04W 72/23* (2023.01); *H04L 5/0051* (2013.01); *H04W 4/40* (2018.02); *H04W 72/51* (2023.01); *H04W 72/543* (2023.01); *H04W 84/18* (2013.01)

(58) Field of Classification Search
CPC .... H04L 5/0051; H04W 4/40; H04W 72/048; H04W 72/087; H04W 72/1294; H04W 84/18
See application file for complete search history.

(56) References Cited

U.S. PATENT DOCUMENTS

| 8,619,729 B2 | 12/2013 | Alper et al. |
| 9,288,793 B2 | 3/2016 | Wang et al. |
| 9,345,039 B2 * | 5/2016 | Pelletier ................ H04W 24/02 |

(Continued)

FOREIGN PATENT DOCUMENTS

| CN | 105165058 | 12/2015 |
| CN | 106464610 | 2/2017 |

(Continued)

OTHER PUBLICATIONS

Huawei, HiSilicon, "Discussion on reselection counter in sensing", 3GPP TSG RAN WG1 Meeting #87, R1-1611130, Reno, USA, Nov. 14-18, 2016, 3 pages.

(Continued)

*Primary Examiner* — Alpus Hsu
(74) *Attorney, Agent, or Firm* — Slater Matsil, LLP

(57) ABSTRACT

According to embodiments, a first UE receives from a base station a configuration indicator. The configuration indicator indicates to the first UE for the first UE to measure quality of a sidelink connection from a second UE on resources of a resource pool in a wireless network. The first UE transmits a feedback report to the base station. The feedback report includes an identification of the second UE in the wireless network and a measurement result of the sidelink connection from the second UE.

20 Claims, 10 Drawing Sheets

(51) Int. Cl.
*H04W 72/543* (2023.01)
*H04W 84/18* (2009.01)

(56) References Cited

U.S. PATENT DOCUMENTS

| | | | |
|---|---|---|---|
| 9,544,099 B2 | 1/2017 | Etemad | |
| 9,775,135 B2 | 9/2017 | Seo et al. | |
| 9,825,747 B2* | 11/2017 | Chen | H04L 5/0057 |
| 9,907,056 B2 | 2/2018 | Bagheri et al. | |
| 9,942,917 B2 | 4/2018 | Faurie et al. | |
| 10,034,293 B2 | 7/2018 | Huang et al. | |
| 10,142,957 B2 | 11/2018 | Sheng | |
| 10,149,280 B2 | 12/2018 | Baghel et al. | |
| 10,237,874 B2 | 3/2019 | Mok et al. | |
| 10,440,520 B2 | 10/2019 | Sheng et al. | |
| 10,477,527 B2 | 11/2019 | Jiang et al. | |
| 10,491,426 B2 | 11/2019 | Xu et al. | |
| 10,499,370 B2 | 12/2019 | Xu et al. | |
| 10,524,099 B2 | 12/2019 | Xu et al. | |
| 10,531,353 B2 | 1/2020 | Baghel et al. | |
| 10,531,460 B2 | 1/2020 | Chae et al. | |
| 10,536,949 B2 | 1/2020 | Sheng | |
| 2013/0322277 A1 | 12/2013 | Vanganuru et al. | |
| 2015/0133141 A1 | 5/2015 | Song et al. | |
| 2015/0319797 A1 | 11/2015 | Yamada et al. | |
| 2016/0050566 A1 | 2/2016 | Li et al. | |
| 2016/0223643 A1 | 8/2016 | Li et al. | |
| 2017/0332352 A1 | 11/2017 | Sheng | |
| 2018/0049235 A1 | 2/2018 | Baghel et al. | |
| 2018/0070400 A1* | 3/2018 | Wu | H04W 4/06 |
| 2018/0115917 A1 | 4/2018 | Wilhelm et al. | |
| 2018/0132282 A1* | 5/2018 | Ly | H04W 74/085 |
| 2018/0167790 A1 | 6/2018 | Cavalcanti et al. | |
| 2018/0176891 A1 | 6/2018 | Kim et al. | |
| 2018/0279311 A1* | 9/2018 | Yoo | H04B 17/11 |
| 2018/0302889 A1* | 10/2018 | Guo | H04B 17/309 |
| 2019/0020987 A1 | 1/2019 | Khoryaev et al. | |
| 2019/0021095 A1 | 1/2019 | Xi et al. | |
| 2019/0075548 A1 | 3/2019 | Lee et al. | |
| 2019/0124669 A1 | 4/2019 | Luo | |
| 2019/0149279 A1 | 5/2019 | Lee et al. | |
| 2019/0200389 A1 | 6/2019 | Li et al. | |
| 2019/0208449 A1 | 7/2019 | Wang | |
| 2019/0239112 A1* | 8/2019 | Rao | H04L 1/08 |
| 2019/0261216 A1* | 8/2019 | Lee | H04L 47/11 |
| 2019/0319723 A1* | 10/2019 | Axmon | H04B 17/309 |
| 2019/0327618 A1 | 10/2019 | Li et al. | |
| 2020/0163028 A1* | 5/2020 | Chae | H04W 52/38 |
| 2020/0228257 A1* | 7/2020 | Baldemair | H04L 1/1614 |

FOREIGN PATENT DOCUMENTS

| | | |
|---|---|---|
| CN | 106559732 A | 4/2017 |
| CN | 106973356 A | 7/2017 |
| CN | 107040557 A | 8/2017 |
| CN | 107040960 A | 8/2017 |
| CN | 107645735 A | 1/2018 |
| CN | 107682838 A1 | 2/2018 |
| WO | 2013108219 A1 | 7/2013 |
| WO | 2017122976 A1 | 7/2017 |
| WO | 2017166277 A1 | 10/2017 |
| WO | 2017171908 A | 10/2017 |

OTHER PUBLICATIONS

Heng Hu,:"Resource Allocation Based on Resource Pool in Vehicle-Vehicle Communication mechanism", Dec. 2016, 7 pages.

Huawei et al., "Remaining details of supporting traffic with shorter periodicity", 3GPP TSG RAN WG1 Meeting #87, R1-1611131, Nov. 14-18, 2016, Reno, USA, 2 pages.

Intel Corporation, "Sharing Resource Pool for eNB-Controlled and UE-Autonomous V2V Transmission Modes", 3GPP TSG RAN WG1 Meeting #92, R1-1802368, Athens, Greece, Feb. 26, 2018-Mar. 2, 2018, 6 pages.

ZTE, "Consideration on resource pool sharing between UEs using mode 3 and mode 4", 3GPP TSG-RAN2 Meeting #101, R2-1801961, Athens, Greece, Feb. 26, 2018-Mar. 2, 2018, total 4 pages.

* cited by examiner

PROTECTION FOR MODE-3 V2X UES IN THE ITS BAND

CROSS-REFERENCE TO RELATED APPLICATIONS

This application is a divisional of U.S. patent application Ser. No. 15/989,755, entitled "Improved Protection for Mode-3 V2X UEs in the ITS Band," filed on May 25, 2018, which application is hereby incorporated herein by reference.

TECHNICAL FIELD

The present disclosure relates generally to a system and method for wireless communication, and, in particular embodiments, to a system and method for improved protection in Mode 3 vehicle-to-everything (V2X) communications.

BACKGROUND

In the 3rd Generation Partnership Project (3GPP), and in particular, Release-14 and Release-15 of the 3GPP specification, support for vehicle-to-everything (V2X) and vehicle-to-vehicle (V2V) communication for Long Term Evolution (LTE) and $5^{th}$ Generation (5G) wireless technologies has been documented. For Release-16, study of V2X for NR has begun, and it is widely expected that V2X will be specified in Rel-16/17 for a variety of bands. In addition, various international commissions have allocated spectrum to support intelligent transportation system (ITS) applications for a number of technologies (e.g., NR, LTE, etc.). For example, the European Commission has reserved parts of the 5.9 Gigahertz (GHz) band as an ITS band for purposes of V2X and V2V communications.

In Release-15 of the 3GPP specification, effort is underway to standardize different scheduling techniques for V2X communications. One scheduling technique uses a base station to schedule resources for V2X communication by the UE—Mode 3. Another scheduling technique relies on the UE to assign resources for V2X communication independent of the base station after sensing the V2X channels—Mode 4. In a V2X communication where UEs are scheduled by a base station and in an environment where different wireless and scheduling technologies coexist, it is desirable to implement techniques to reduce resource interference and increase signal reliability between UEs. When NR V2X is standardized, it is likely that a mode-3 equivalent (where the base station schedules the UEs), and a mode-4 equivalent (where the UE autonomously selects resources) will be standardized and it is expected that there will be deployments where UEs with both modes of operation are active in the same space.

SUMMARY

Technical advantages are generally achieved by embodiments of this disclosure, which describe systems and methods for improved protection in Mode 3 vehicle-to-everything (V2X) communications.

In accordance with an embodiment, a method for vehicle-to-everything (V2X) communication in a wireless network is provided. In this embodiment, the method includes transmitting, by a base station, a resource grant message to a first user equipment (UE), the resource grant message identifying available resources for V2X communication by the first UE. The method further includes receiving, by the base station, a feedback report from a second UE, the feedback report indicating a quality of the V2X communication by the first UE. In one example, the method further includes transmitting, by the base station, a second resource grant message to the first UE in accordance with the feedback report. The second resource grant message identifying available resources for a second V2X communication by the first UE. Optionally, in such an example, or in another example, a subset of data transmitted in a packet of the second V2X communication includes a subset of data transmitted in a packet of the first V2X communication. Optionally, in any one of the above mentioned examples, or in another example, the method further includes receiving, by the base station, a sensing information from the first UE, the sensing information being a representation of available resources within a time-limited sensing window. Optionally, in any one of the above mentioned examples, or in another example, the sensing information includes a signal quality parameter from the first UE. The signal quality parameter including at least one of a reference signal received power (RSRP), a reference signal received quality (RSRQ), a received signal strength indication (RSSI), a signal-to-interference ratio (SIR), a signal-to-noise plus interference ratio (SINR), or a frame rate error (FER) measurement. Optionally, in any one of the above mentioned examples, or in another example, the sensing information includes a set of potential candidate resources identified by the first UE. Optionally, in any one of the above mentioned examples, or in another example, the resource grant message is transmitted, by the base station, to the first UE in a physical downlink control channel (PDCCH). Optionally, in any one of the above mentioned examples, or in another example, the resource grant message is transmitted, by the base station, using a downlink control information (DCI) format 5A message type. Optionally, in any one of the above mentioned examples, or in another example, the method further includes transmitting, by the base station, a configuration request message to one or more UEs, the configuration request message configuring each of the one or more UEs to monitor the quality of the V2X communication of the first UE. Optionally, in any one of the above mentioned examples, or in another example, the configuration request message further includes configuring each of the one or more UEs to transmit a corresponding feedback report indicating the quality of the V2X communication of the first UE to the base station. Optionally, in any one of the above mentioned examples, or in another example, the configuration request message includes at least one of a downlink control information (DCI) message, a media access control (MAC) control element message, or a radio resource control (RRC) message. Optionally, in any one of the above mentioned examples, or in another example, the configuration request message includes a set of coordinates and a radius to identify a geographical zone. Optionally, in any one of the above mentioned examples, or in another example, the available resources for V2X communication includes available resources in an intelligent transportation systems (ITS) band. Optionally, in any one of the above mentioned examples, or in another example, the transmitting the resource grant message to the first UE is over a cellular band. Optionally, in any one of the above mentioned examples, or in another example, the V2X communication is a sidelink transmission. Optionally, in any one of the above mentioned examples, or in another example, the V2X communication includes transmitting a control channel, by the first UE to the surrounding UEs, on a physical sidelink control channel (PSCCH) in a sidelink control information (SCI) message.

The V2X communication also includes transmitting a data message, by the first UE to the surrounding UEs, on a physical sidelink shared channel (PSSCH). Optionally, in any one of the above mentioned examples, or in another example, the SCI message includes a UE scheduling information bit identifying a scheduling type of the first UE. The scheduling type being a base station scheduled UE or an autonomously scheduled UE.

In accordance with another embodiment, A method for vehicle-to-everything (V2X) communication in a wireless network is provided. In this embodiment, the method includes receiving, by a user equipment (UE), a configuration indicator configuring the UE to probe the V2X communication for signal quality. The method also includes transmitting, by the UE, a feedback report to a base station. The feedback report indicating a quality of the V2X communication in the wireless network. In one example, an interface for V2X communication in the wireless network is a sidelink connection and the quality of the sidelink connection is evaluated using a reference signal (RS) on a physical sidelink shared channel (PSSCH) of the sidelink connection. Optionally, in such an example, or in another example, resources used for V2X communication includes resources in an intelligent transportation systems (ITS) band and the feedback report includes channel-state information (CSI). Optionally, in any one of the above mentioned examples, or in another example, the method further includes transmitting, by the UE, the feedback report to the base station using a physical uplink control channel (PUCCH), a physical uplink shared channel (PUSCH), or a random access channel (RACH). Optionally, in any one of the above mentioned examples, or in another example, the feedback report includes a signal quality parameter including at least one of a reference signal received power (RSRP), a reference signal received quality (RSRQ), a received signal strength indication (RSSI), a signal-to-interference ratio (SIR), a signal-to-noise plus interference ratio (SINR), or a frame error rate (FER) measurement. Optionally, in any one of the above mentioned examples, or in another example, the configuration indicator is a probing request from the base station. The probing request indicating resources to be monitored or a second UE to be monitored in the V2X communication. Optionally, in any one of the above mentioned examples, or in another example, the probing request includes at least one of a downlink control information (DCI) message, a media access control (MAC) control element message, or a radio resource control (RRC) message. Optionally, in any one of the above mentioned examples, or in another example, the method further includes receiving, by the UE, a resource grant message from the base station. The resource grant message identifying available resources for transmitting the feedback report. Optionally, in any one of the above mentioned examples, or in another example, the transmitting the feedback report further includes transmitting over an uplink (UL) control channel. The feedback report includes an identifier of a second UE scheduled by the base station for the V2X communication. Optionally, in any one of the above mentioned examples, or in another example, the feedback report is transmitted in response to the UE not receiving a message over a sidelink connection extending to the UE for V2X communication. Optionally, in any one of the above mentioned examples, or in another example, the feedback report includes an indicator used to indicate whether a message is received in the V2X communication. Optionally, in any one of the above mentioned examples, or in another example, the feedback report includes an indicator used to indicate whether a message received by the UE in the V2X communication corresponds to a message sent from a base-station-scheduled UE or an autonomously-scheduled UE. Optionally, in any one of the above mentioned examples, or in another example, a second UE is configured using semi-persistent scheduling (SPS) and the second UE is scheduled by the base station for the V2X communication. The UE transmits the feedback report after each reception of an individual message or only in response to a first reception of a message from the second UE. Optionally, in any one of the above mentioned examples, or in another example, the receiving the configuration indicator further includes receiving, by the UE, a resource grant message from a base station. The resource grant message identifying available resources to a second UE for V2X communication and each of the UEs share a physical downlink control channel search space and a radio network temporary identifier (RNTI).

In accordance with yet another embodiment, a base station in a wireless network is provided. The base station includes a non-transitory memory storage comprising instructions and a processor in communication with the non-transitory memory storage. The processor executes the instructions to transmit a resource grant message to a first user equipment (UE). The resource grant message identifies available resources for V2X communication by the first UE in the wireless network. The processor also executes the instructions to receive a feedback report from a second UE. The feedback report indicates a quality of the V2X communication in the wireless network.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
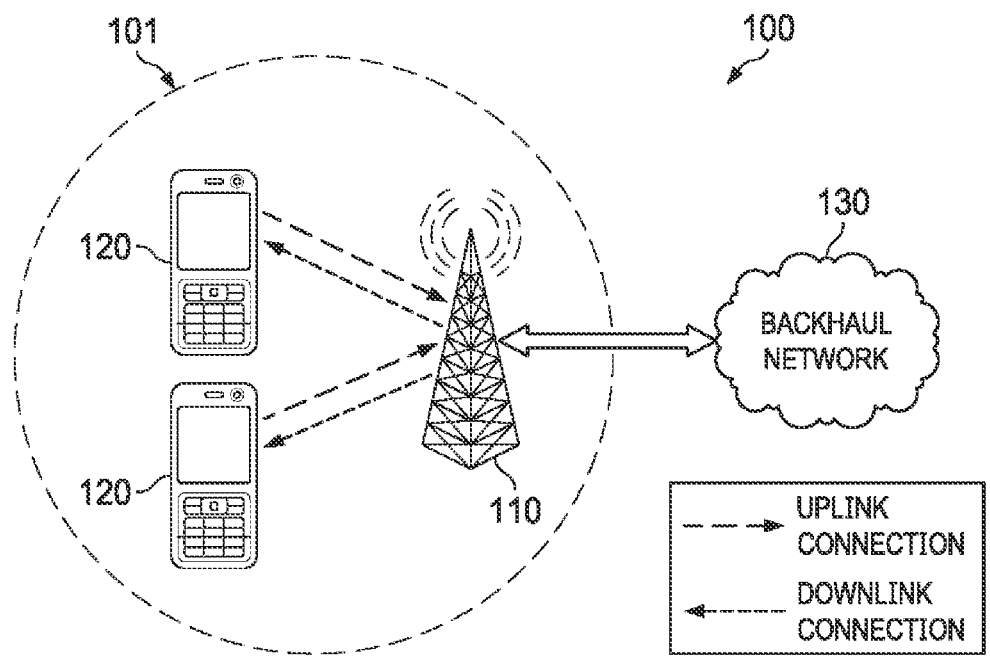
FIG. 1 is a diagram of an embodiment wireless communications network.

This disclosure provides many applicable inventive concepts that can be embodied in a wide variety of specific contexts. The specific embodiments are merely illustrative of specific configurations and do not limit the scope of the claimed embodiments.

As used herein, the term "Vehicle-to-Everything (V2X) communications" refers to wireless communications between a vehicle and another device, including (but not limited to) uplink and/or downlink transmissions between a vehicle and a base station, vehicle-to-vehicle (V2V) communications between two or more vehicles, vehicle-to-infrastructure (V2I) communications between a vehicle and elements of roadway infrastructure (e.g., traffic lights, tolling, etc.), and vehicle-to-pedestrian (V2P) communications between a vehicle and a pedestrian.

Although many embodiments of this disclosure are described in the context of Long Term Evolution (LTE)-based and New Radio (NR)-based V2X communication networks, it should be appreciated that such embodiments may also be implemented in other standards compliant communications systems, such as those compliant with the Institute of Electrical and Electronic Engineers (IEEE) 802.11 and/or other technical standards, as well as in non-standards compliant communication systems. As used herein, the term "network" refers to any collection of two or more devices that communicate directly or indirectly with one another, including those in which a user-side device communicates directly with a network-side device, those in which user-side devices communicate indirectly with one another via network-side-devices, and those in which user-side devices communicate directly with one another without relaying their communications through intermediate network-side devices. Other examples are possible, such as machine-to-machine (M2M) networks in which network-side devices communicate directly with one another.

V2X communication may enable the exchange of information between a vehicle and other vehicles, pedestrians, and infrastructures. In some embodiments, information exchanged via V2x communications may compliment information generated by vehicle sensors (e.g., radar, camera, ultrasonic, etc.) to provide vehicle autonomy and traffic predictability. V2X communication may provide numerous benefits, including (but not limited to) improvements in safety (e.g., forward collision warning, road work notification, situational awareness, conveying intent, etc.), energy efficiency (e.g., enhanced route selection, route travel time savings, etc.), and convenience (e.g., real time route correction, traffic signal priority, etc.). V2X communications may utilize various features of the device-to-device (D2D) communication protocols standardized in Release-12 and Release-13 of the 3rd Generation Partnership Project (3GPP). For example, V2X communications may occur over sidelink interfaces between UEs without the V2X communications being forwarded through an intermediate base station (e.g., Evolved Node B (eNodeB or eNB), etc.). Messages in D2D and V2V may be transmitted on a physical sidelink discovery channel (PSDCH), a physical sidelink shared channel (PSSCH), a physical sidelink control channel (PSCCH), a physical sidelink broadcast channel (PSBC), or on other signaling, such as primary sidelink synchronization signal (PSSS) or secondary sidelink synchronization signal (SSSS).

It should also be noted that the European Commission (EC) and the Federal Communications Commission (FCC) have allocated 75 MHz of bandwidth, in the 5.9 Gigahertz (GHz) region, for intelligent transportation system (ITS) applications. This allocated spectrum may be shared between different technologies (e.g., NR, LTE, etc.). While embodiments may be described primarily in terms of mode-3 LTE V2X UEs sharing the band with mode-4 LTE-V2X UEs, it should be appreciated that those described embodiments may also cover other scenarios, such as where "mode-3" NR V2X UEs share the band with mode-4 LTE V2X UEs and/or "mode-4" NR V2X UEs share the band with mode-4 LTE V2X UEs.

Generally, a V2X message can be broadcasted over the ITS band by a UE without network involvement, known as Mode 4, or by a UE scheduled by a base station, known as Mode 3. In a situation where both Mode 3 and Mode 4 UEs can select the same resources from a pool of resources, a problem may arise when the autonomously scheduled UE (i.e., Mode 4) and the base station scheduled UE (i.e., Mode 3) select the same resources for V2X communication, which results in signal interference and poor signal reliability. Additional problems may arise when the V2X communication is a periodic message and the UEs coexist on the same carrier. Embodiments of this disclosure provide improved scheduling solutions for a base station scheduled UE.

FIG. 1 is diagram of a network 100 for communicating data. The network 100 includes a base station 110 having a coverage area 101, a plurality of UEs 120, and a backhaul network 130. As shown, the base station 110 establishes uplink (dashed line) and/or downlink (dotted line) connections with the UEs 120, which serve to carry data from the UEs 120 to the base station 110 and vice-versa. Data communicated over the uplink/downlink connections may include data communicated between the UEs 120, as well as data communicated to/from a remote-end (not shown) by way of the backhaul network 130. As used herein, the term "base station" refers to any network-side device configured to provide wireless access to a network, such as an enhanced Node B (eNodeB or eNB), agNB, a transmit/receive point (TRP), a macro-cell, a femtocell, a Wi-Fi Access Point (AP), and other wirelessly enabled devices. Base stations may provide wireless access in accordance with one or more wireless communication protocols, e.g., 5th generation new radio (5G NR), LTE, LTE advanced (LTE-A), High Speed Message Access (HSPA), Wi-Fi 802.11a/b/g/n/ac, etc. As used herein, the term "UE" refers to any user-side device configured to access a network by establishing a wireless connection with a base station, such as a mobile device, a mobile station (STA), a vehicle, and other wirelessly enabled devices. In some embodiments, the network 100 may include various other wireless devices, such as relays, low power nodes, etc.

Figure 2:
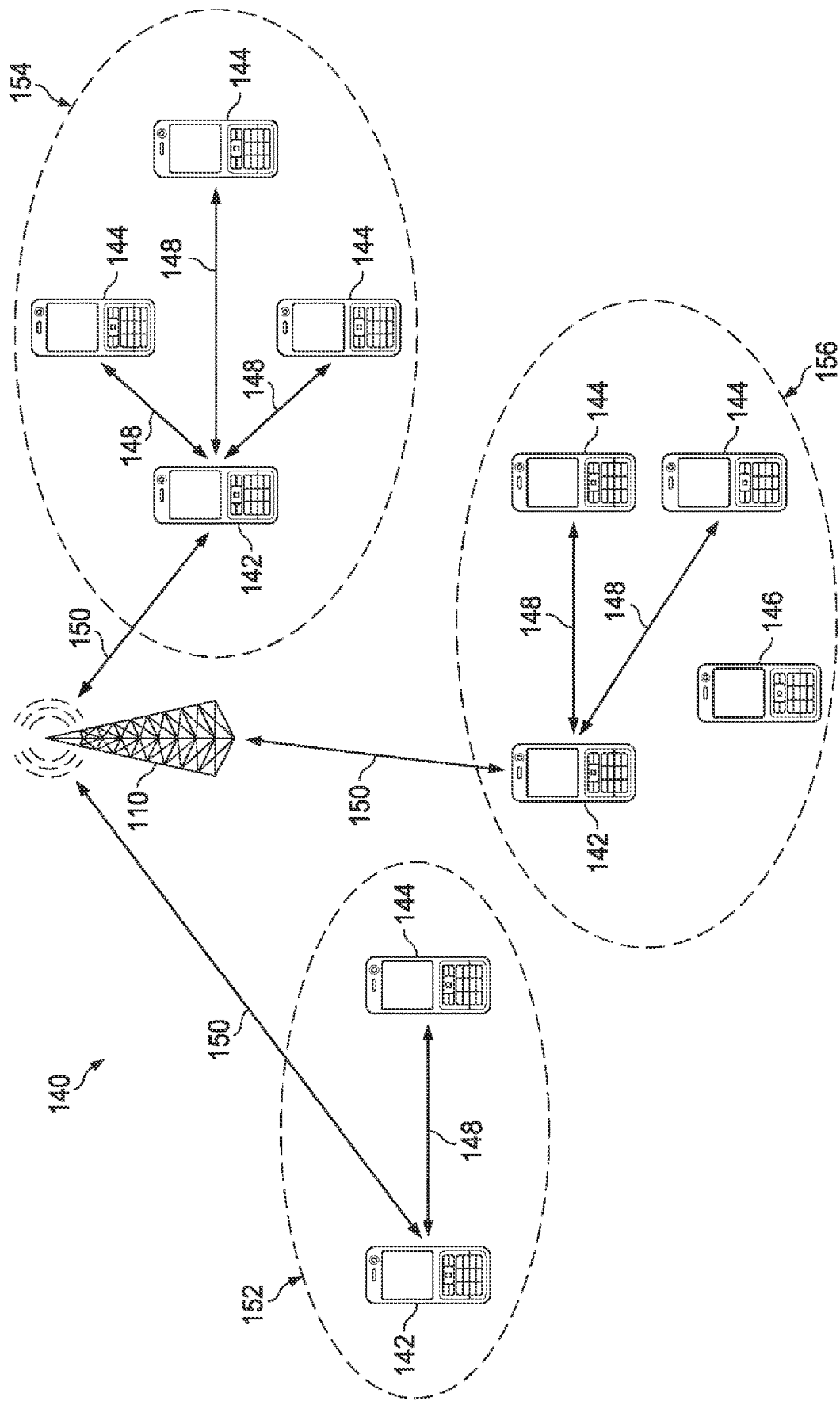
FIG. 2 is a diagram of an embodiment vehicle-to-everything (V2X) communication for a user equipment (UE) scheduled by a base station—Mode 3.

FIG. 2 illustrates a diagram 140 of an embodiment Mode 3 deployment configuration in a V2X network. In the Mode 3 V2X deployment configuration, the base station 110 schedules resources for V2X communication by one or more UEs 142, 144. The V2X communication can be over a dedicated (i.e., designated) carrier for V2X communication, such as the ITS band. The base station 110 allocates resources to each UE 142 for V2X communication over a cellular link 150 extending between the base station 110 and UE 142. The V2X communication is performed over a V2X communication interface 148 extending from UE 142 to UE 144. Although in FIG. 2, a single UE 142 and one to three UE 144 are shown, additional numbers of UE 142 and UE 144 may be contemplated. In a typical mode-3 embodiment, the UE would receive a grant for V2X communication and other control messages over link 148, and V2X data communication would occur over link 150.

It should be appreciated that in some embodiments, UE 142, 144, 146 may be a vehicle and the communication interface may be a sidelink communication interface extending from UE 142 to UE 144. It should also be appreciated that in some embodiments, UE 144, 146 may also communicate directly with the base station 110 over a cellular link. The V2X communication can be unicast 152, broadcast 154, or multicast 156. In unicast 152, UE 142 communicates with a single UE 144; in broadcast 154, UE 142 communicates with all UE 144 devices; and in multicast 156, UE 142 communicates with one or more, but not necessarily all, UE 144 devices. As an example, UE 146 does not communicate with UE 142 in the multicast 156 transmission. Additional addressing schemes may also be contemplated.

Figure 3:
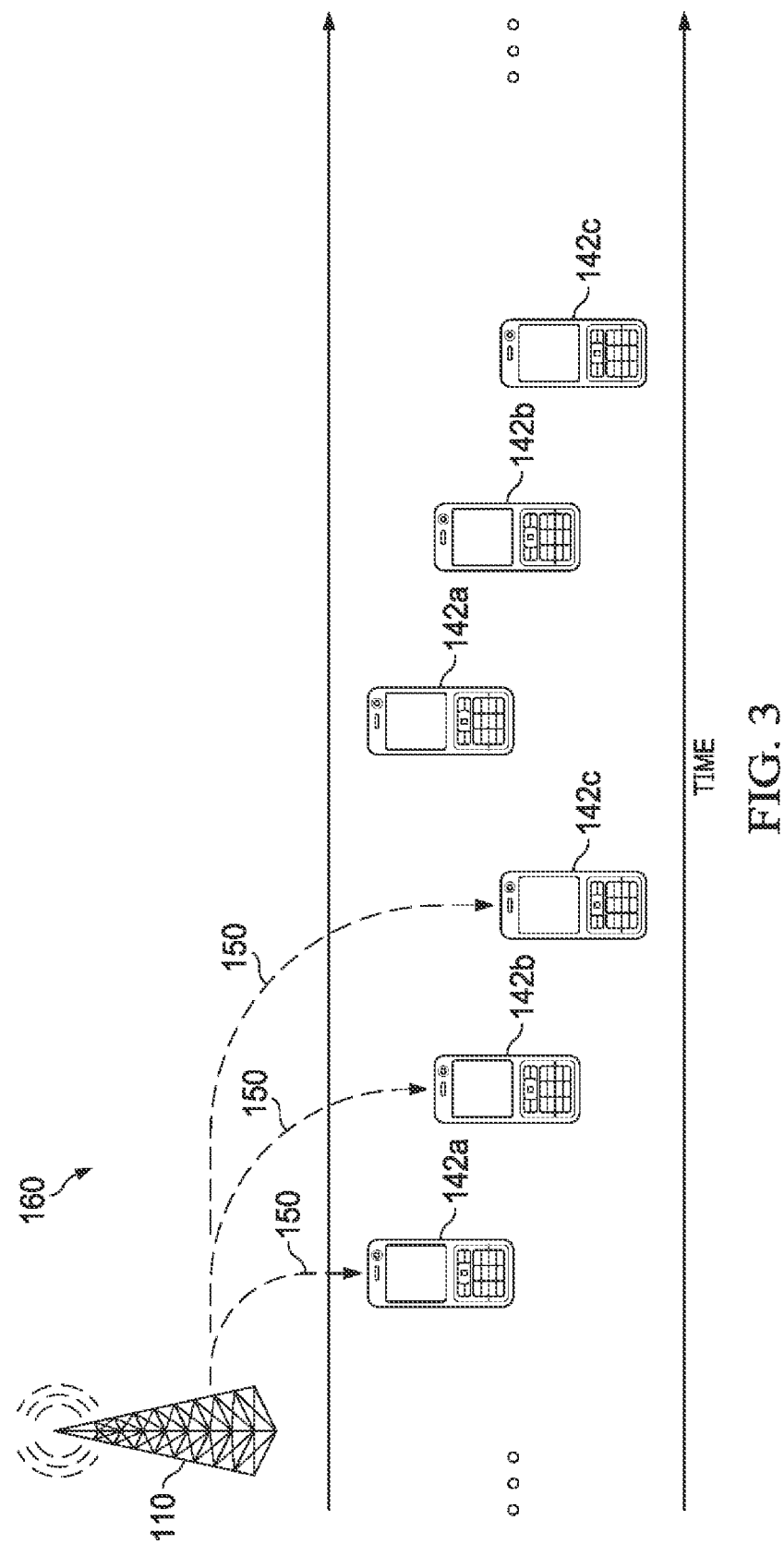
FIG. 3 is a diagram of an embodiment communications sequence for base station scheduling of a UE for V2X communication—Mode 3.

FIG. 3 illustrates a diagram of an embodiment communications sequence for base station 110 scheduling of UE 142 for V2X communication over a dedicated carrier. The base station 110 may transmit a resource grant message, e.g., by using a physical downlink control channel (PDCCH) or a downlink control information (DCI) message based on format 5A over the cellular band link 150. In this configuration, each UE 142a, 142b, 142C is assigned a different resource from the base station 110 in the resource grant message.

Typically, the base station 110 operates over the cellular band spectrum and does not perform resource sensing measurements over the ITS band spectrum. In other words, the base station 110 is generally unaware of resource availability at the dedicated carrier of the V2X communication. However, in a solely Mode 3 deployment configuration, as the resource allocation is scheduled by the base station 110, there is minimal chance of collision or interference between the various V2X communications.

Figure 4:
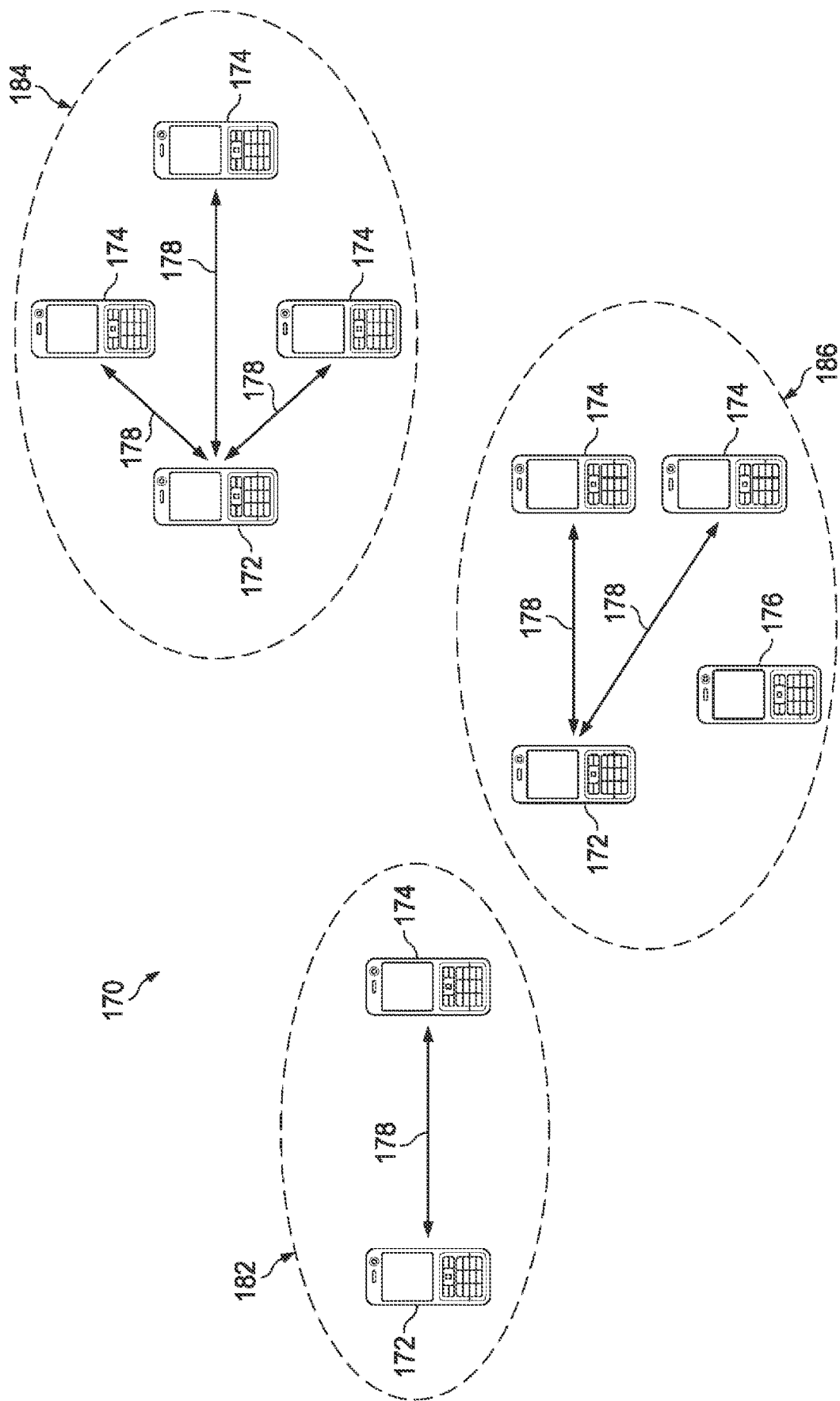
FIG. 4 is a diagram of an embodiment V2X communication for an autonomously scheduled UE—Mode 4.

FIG. 4 illustrates a diagram 170 of an embodiment Mode 4 deployment configuration in a V2X network. In a Mode 4 deployment configuration, scheduling and interference management of the V2X communication is autonomously implemented between UEs 172 (i.e., self-managed). In such a deployment, UE 172 is not required to be located in a coverage area 101 of the base station 110, the resource selection may be autonomous, and the resources may be selected from resource pools without network assistance. In some embodiments, UE 172, 174, 176 may be a vehicular UE and the communication interface may be a sidelink communication interface extending from UE 172 to UE 174.

In this embodiment, the V2V, V2I, or V2P do not rely on network assistance for scheduling and the V2X communication may operate both in-coverage and out-of-coverage. Similar to FIG. 3, the V2X communication may be a direct communication link 178, such as a sidelink interface extending from Mode 4 UE 172 to UE 174.

Figure 5:
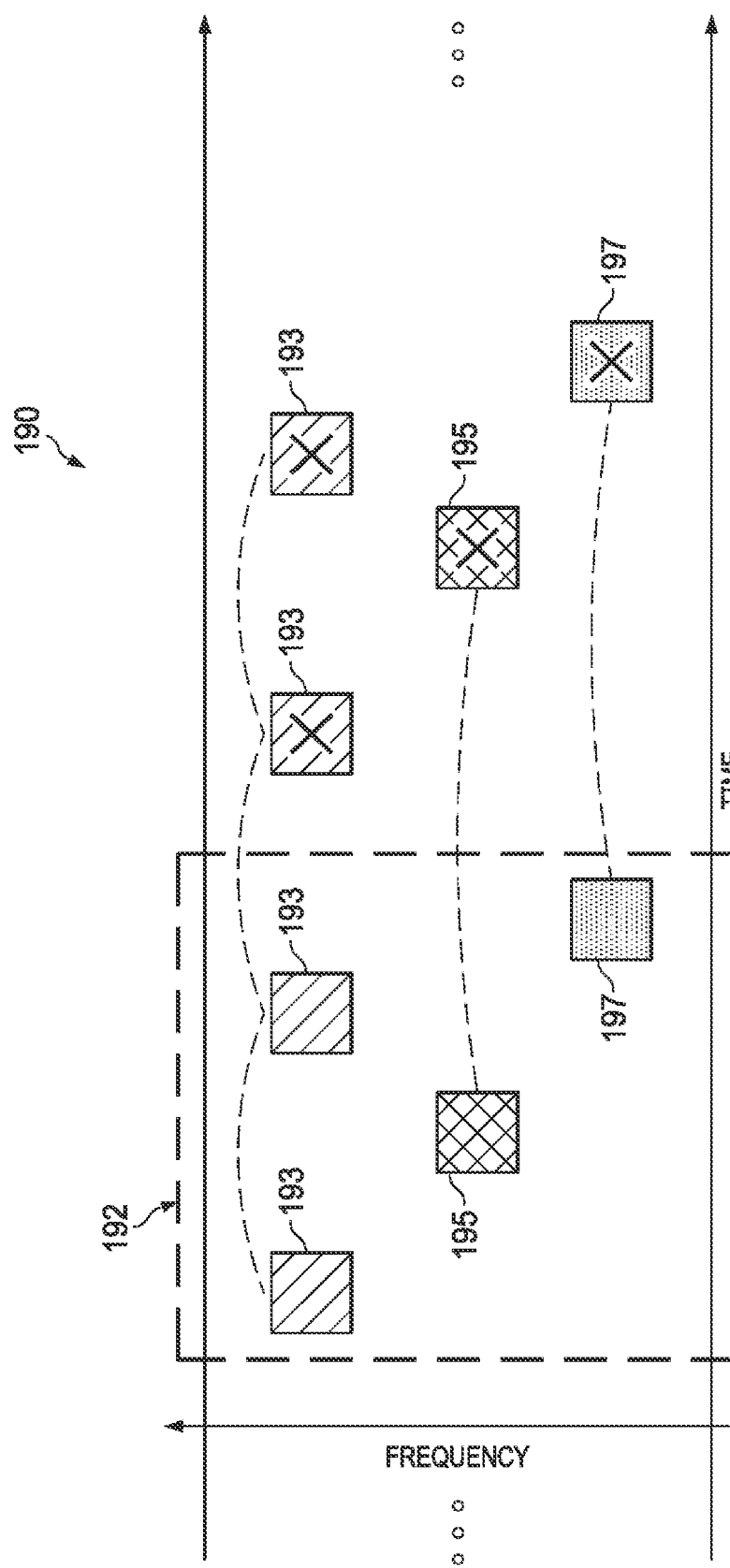
FIG. 5 is a diagram of an embodiment communications sequence for autonomous scheduling by a UE for V2X communication—Mode 4.

FIG. 5 is a diagram 190 of an embodiment communications sequence for autonomous scheduling (i.e., Mode 4) by a UE for V2X communication. A UE 172 senses congestion in a sliding sensing window 192 and optimizes resource scheduling in overlapping resources. Once a UE has selected a resource 193, 195, and/or 197, it indicates it as "reserved in the future" (an 'X' on the figure). Other UEs sensing the media decode the control channel sent by a UE and determine that the resources are reserved for future use. The sensing UE may then not select that resource in the future. In FIG. 5, a first resource 193 is identified by a square with hashing, a second resource 195 is identified by a square with cross hashing, and a third resource 197 is identified by a square with dots. Each resource 193, 195, and 197 may be selected by a UE and reserved for that UE, preventing other UEs from using that same resource at least in a vicinity.

Some advantages of Mode 4 deployment configuration are reduced cost (i.e., network investment), reduced complexity (i.e., coordination between UE and base station), and ability to be deployed outside of network coverage. Similar to Mode 3 deployment, Mode 4 may have unicast 182, broadcast 184, multicast 186, or other types of addressing schemes.

Figure 6:
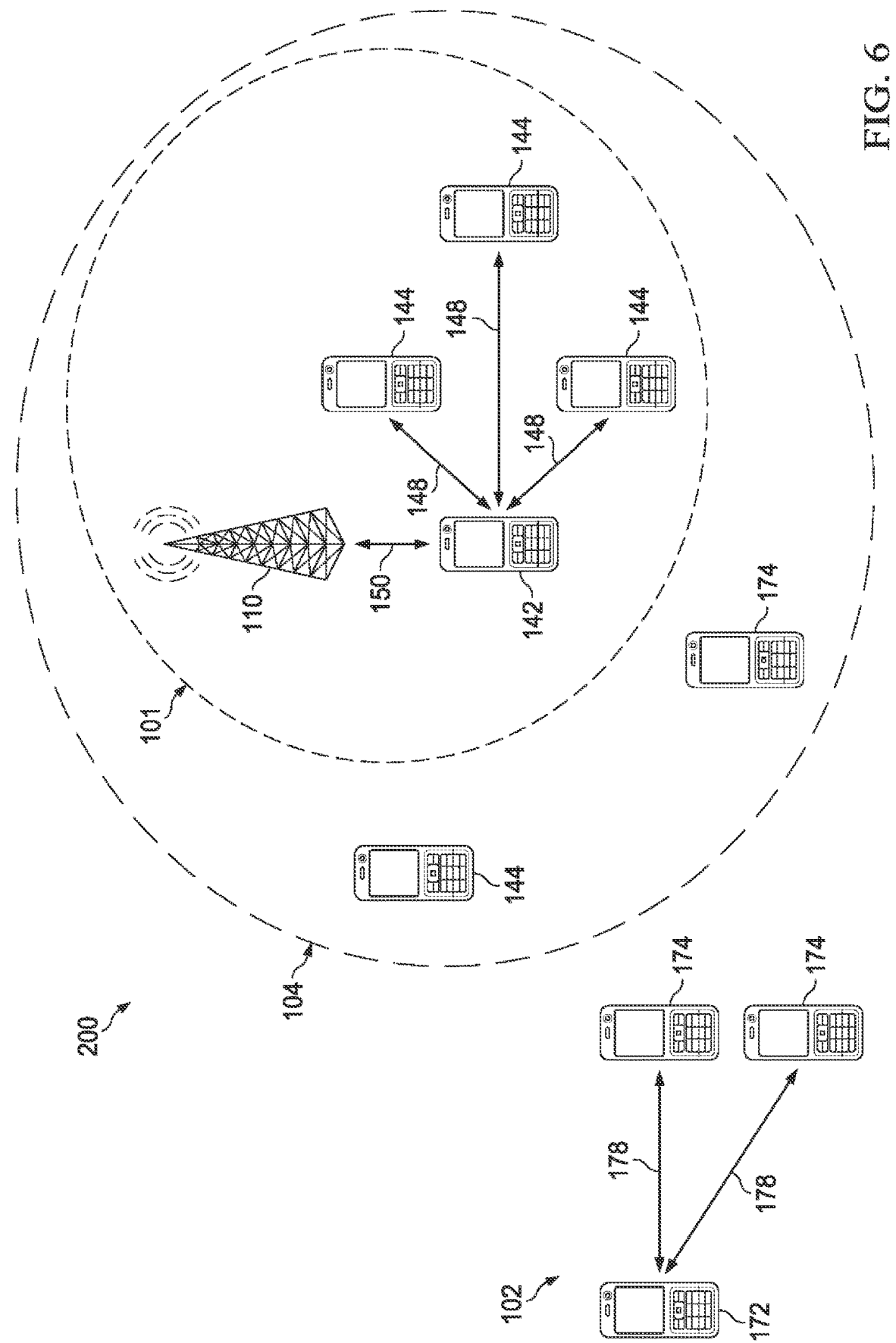
FIG. 6 is a diagram of an embodiment V2X communications network—Mode 3 and Mode 4.

FIG. 6 illustrates a diagram of an embodiment V2X communications network in a combined Mode 3 and Mode 4 deployment configuration. The Mode 3 and Mode 4 configurations can be deployed over the same carrier and can coexist with each other.

In this configuration, Mode 4 UE 172 may select resources from a resource pool shared with Mode 3 UE 142. Mode 4 UE 172 may select resources after sensing the media comprising both Mode 3 UE 142 and any other Mode 4 UE 172. However, the base station 110 may allocate resources for Mode 3 UE 142 without knowledge of the selection of resources and scheduling information related to Mode 4 UE 172.

In some embodiments, Mode 3 UE 142 or Mode 4 UE 172 may travel from a coverage area 101 of the base station 110 to an out-of-coverage area 102 of the base station 110. In a partial coverage zone 104 of the base station 110, UE 144, 174 may be able to receive information from both in-coverage and out-of-coverage UEs. In the partial coverage zone 104, Mode 3 UE 142 (in-coverage) and Mode 4 UE 172 (either in-coverage or out-of-coverage) coexist, and effectively share the same resource pool. It should be noted that in some embodiments, Mode 3 UE 142 or Mode 4 UE 172 may communicate respectively with, UE 144 or UE 174 using a different communication technology, such as, New Radio (NR).

Figure 7:
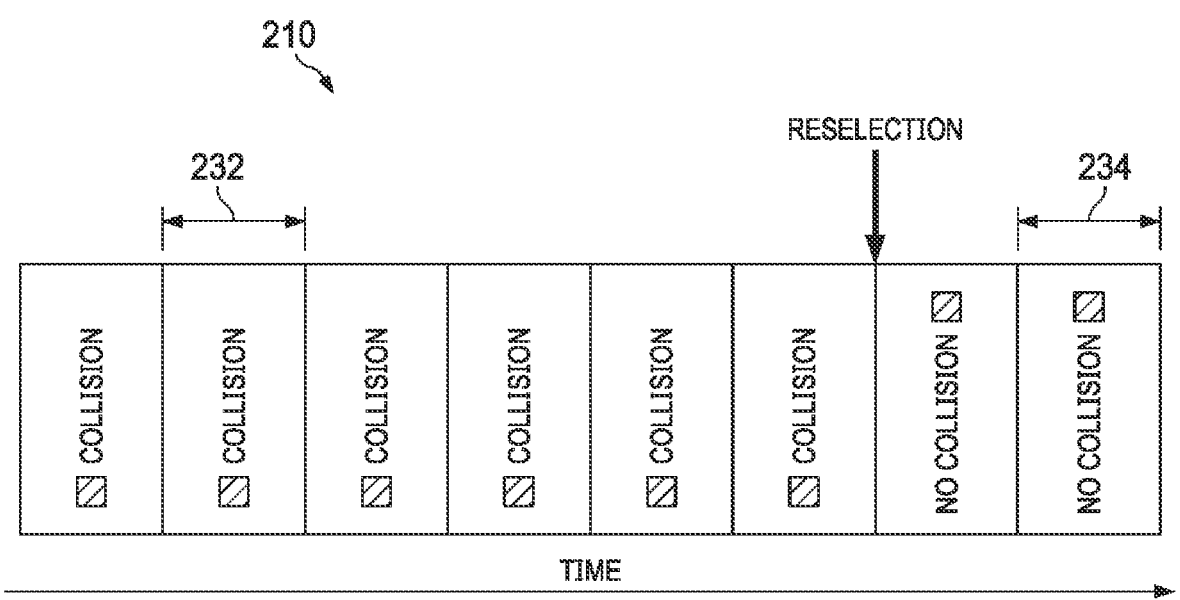
FIG. 7 is a diagram of an embodiment method for reselection in response to resource interference between neighboring UEs.

FIG. 7 illustrates a diagram 210 of an embodiment method for re-selection in response to resource interference between neighboring UEs. As illustrated, in the V2X communication multiple transmissions of unsuccessful packets 232 may occur when two neighboring UEs select the same or overlapping resources at approximately the same time. To communicate a successful packet 234, one of the two UEs may select a different resource or a sufficient distance may be required to separate the UEs. However, both these options can take several seconds. In an embodiment where there is no broadcast feedback, the transmitting UEs may not be aware of the occurrence of the collisions. Similarly, as resource reselection is a relatively rare occurrence, multiple UEs may be prevented from receiving packets for a substantial period of time.

Figure 8:
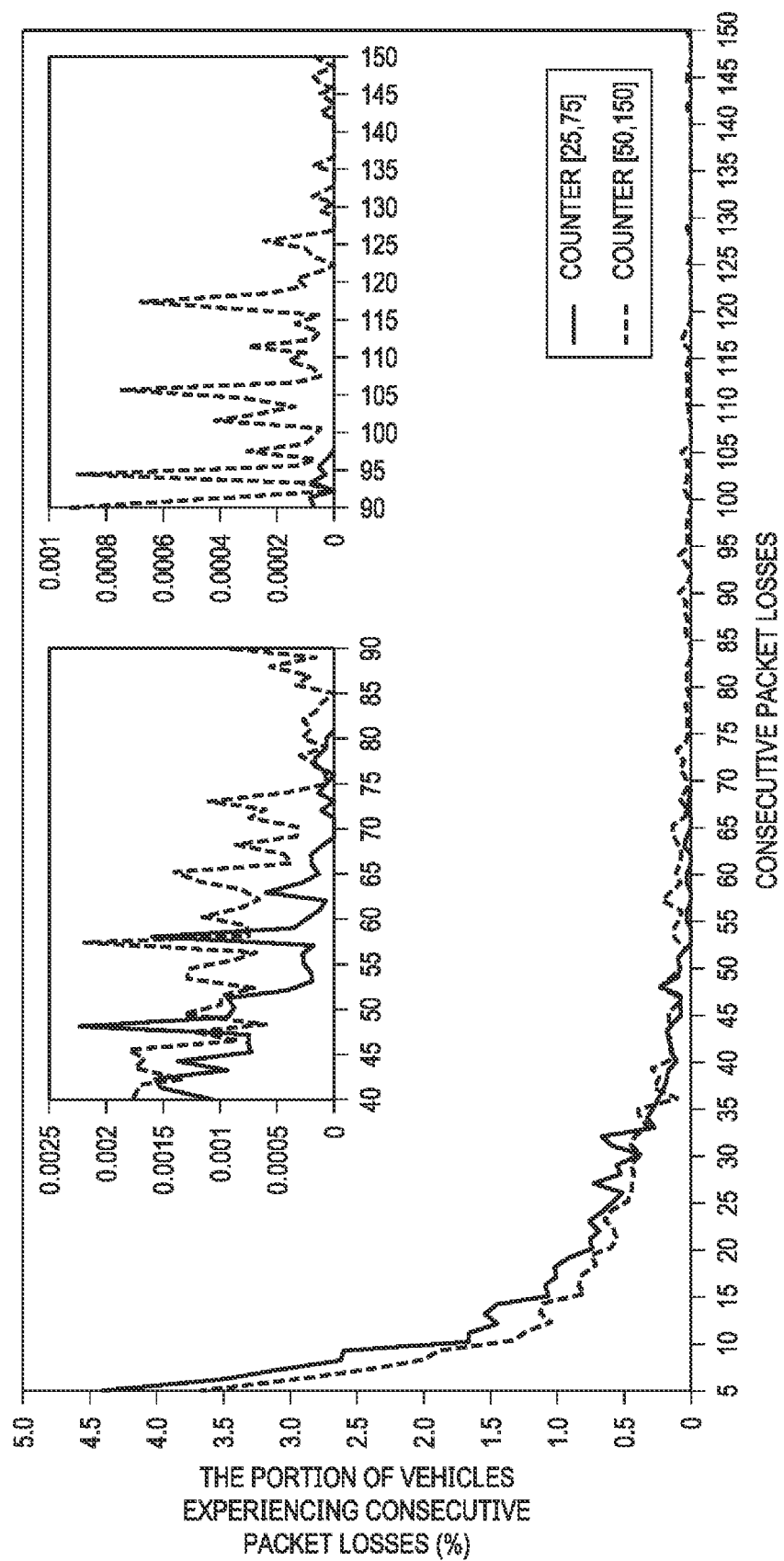
FIG. 8 is a diagram of consecutive packet loss in a V2X communication by a UE.

FIG. 8 is a diagram 220 of an embodiment consecutive packet loss experienced by a Mode 3 UE 142 in a V2X communication as originally presented in a 3GPP contribution paper (R1-1611130 for Mode 4 to Mode 4 interference). As illustrated, a significant portion of UEs can experience consecutive packet loss in the Mode 3 V2X communication. The diagram illustrates that approximately 2.5% of vehicles experience at least ten (10) consecutive packet losses. It should also be noted that in some situations, the percentage of UEs experiencing consecutive packet losses can be greater (e.g., for shorter packet periodicity).

Figure 9:
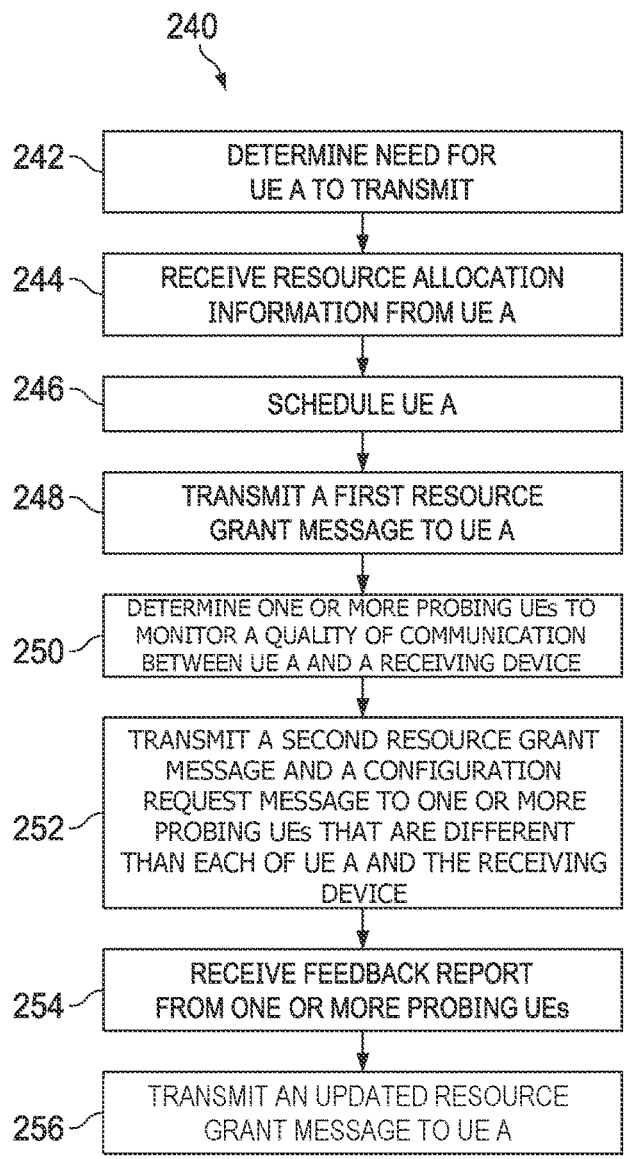
FIG. 9 is a flow chart of an embodiment method for V2X communication, as performed by a base station.

FIG. 9 illustrates a flow chart 240 of an embodiment method for scheduling and receiving a feedback report for V2X communication, as performed by the base station 110. The base station 110 schedules a transmission for UE 142 over a cellular link 150. The base station 110 also instructs one or more neighboring UEs (e.g., UE 144) to serve as probing UEs. The one or more probing UEs monitor the quality of the transmission as performed by UE 142 over the ITS band (e.g., success, interference, collision, etc.) and transmit a feedback report to the base station 110.

At step 242, the base station 110 determines that UE 142, in the coverage area of the base station 110, has a need to transmit data by, for example, receiving a schedule request over the cellular link 150. The data transmission to be performed by UE 142 can be a one-packet transmission (i.e., dedicated packet transmission) or a periodic or semi-persistent message. Embodiments of this disclosure may be applied to both non-periodic one-packet transmission or periodic or semi-persistent transmissions to be performed by UE 142 over the ITS band. For example, the base station 110 may allocate one or more Semi-Persistent-Scheduling (SPS) processes for UE 142 to address a request for semi-persistent transmissions.

At step 244, the base station 110, in order to schedule a resource for UE 142, receives information of available and free resources for V2X communication in the ITS band. The resource allocation information received by the base station 110 from UE 142 may be in response to a request from the base station, independently initiated by UE 142, or initiated by a neighboring UE. In an embodiment where UE 142 independently (i.e., without receiving a request from the base station 110) transmits available resources in the ITS band to the base station 110, steps 242 and 244 may be merged.

In some embodiments, the base station 110, prior to receiving the resource allocation information, may transmit a resource allocation information request message to UE 142. The resource allocation information request message can include a sensing window information or a measurement threshold. In response to the resource allocation information request message, the base station may receive a corresponding response message from UE 142 over a communications link (e.g., the cellular link 150, relay links, sidelinks, etc.) indicating the free resources in the ITS band for V2X communication. The response message may be received over the cellular link 150 using, for example, a radio resource control (RRC) protocol, a physical uplink control channel (PUCCH), or a random access channel (RACH).

In some embodiments, the base station 110 may receive sensing information representing available resources within a time-limited sensing window from UE 142 and/or a set of potential candidate resources identified by UE 142. The sensing information may include a signal quality parameter from UE 142, which can be at least one of a reference signal received power (RSRP), a reference signal received quality (RSRQ), a received signal strength indication (RSSI), a signal-to-interference ratio (SIR), a signal-to-noise plus interference ratio (SINR), or a frame rate error (FER) measurement.

Measurements on reference signals may be performed on a variety of reference signals including, but not limited to, channel state information reference signals (CSI-RS), beamforming reference signals, synchronizations signals (SS) or SS/PBCH (physical broadcast channel) blocks, and so forth. An index or an indicator associated with a particular reference signal, such as a CSI-RS resource indicator (CRI) or an SS/PBCH block resource indicator (SSBRI), may be included in the message that carries the sensing information. The purpose of the index or indicator may be to distinguish a particular reference signal resource in the case that multiple pre-coded reference signals use multiple resources or multiple sets of resources and precoding for reference signals transmitted on different resources or difference sets of resources may be different. Indicating a resource, in this case, may implicitly indicate a particular precoding. The said precoding may include, for example, digital precoding at the baseband and/or analog radio frequency (RF) beamforming, which may be necessary or useful especially in millimeter-wave (mmWave) systems operating, for example, at a high-frequency (HF) or in frequency range 2 (FR2).

In some embodiments, the sensing information may include a reference signal resource indicator or a set of reference signal resource indicators, but not associated signal quality values. Then, the base station may infer, for example, based on a predetermined protocol, that the indicated reference signal resources are appropriate, or inappropriate, for a new scheduling.

At step 246, the base station 110 may perform scheduling for UE 142. The base station 110 selects resources for V2X communication over the ITS band by UE 142 in accordance with the response message received from UE 142 in step 244 (i.e., sensing information, set of signal quality parameters, set of potential candidate resources, etc.). At step 248, the base station 110 transmits a resource grant message to UE 142 over the cellular link 150 identifying resources in the ITS band for V2X communication by UE 142. The base station 110 may transmit the resource grant message in a physical downlink control channel (PDCCH) or using a downlink control information (DCI) format 5A message type. In embodiments where base station 110 configures UE 142 using semi-persistent scheduling (SPS), the base station 110 may transmit the resource grant message to UE 142 using, for example, a radio resource control (RRC) protocol or a media access control (MAC) address.

At step 250, once the base station 110 has determined that UE 142 has a need to transmit data in a V2X communication, it may identify one or more neighboring UEs to serve as probing UEs. In an embodiment where UE 142 broadcasts a transmission (e.g., Rel-14 safety services) to all UEs, the base station 110 may select one or more probing UEs from the group of UEs receiving the broadcast based on one or more set criteria. As an example, the base station 110 may select a subset of the receiving UEs as probing UEs, in accordance with a known location information of Mode 3 configurable UEs in the vicinity of UE 142. As another example, the base station 110 randomly selects a subset of Mode 3 UEs within a designated distance or a geographic range of UE 142. In some embodiments, the probing UEs may be a subset of UEs receiving the V2X communication located on the highway while a subset of UEs receiving the V2X communication travelling on a neighboring road may be excluded in the UE probe selection. A probing UE may be identified in accordance with the signal strength of the V2X communication over the ITS band received from UE 142 during the probing stage or during a prior broadcast. In an embodiment, a probing mechanism with unused resources may be used where only a small set of devices are allowed to broadcast for the purpose of measuring the signal strength at the receiving devices. Probing may be done for instance using spreading codes, where the probing signals may be sent less often and may be shorter than a normal broadcast. In another example, the initial broadcast by UE 142 can be a probing transmission, where receiving UEs may be configured to report a signal strength of the probing transmission to the base station 110 over the cellular link 150. In an embodiment, the quality of the transmission by UE 142 may be inspected to assess whether a Packet Reception Ratio (PRR) at receiving UEs meet a threshold at a particular distance, for example, 90% at a 300 meter distance. The one or more UEs that meet the designated threshold can then be chosen as probing UEs.

In an embodiment where the transmission by the UE 142 is a unicast transmission (e.g., sensor sharing applications), the base station may designate a Mode 3 configurable intended target of the data transmission to serve as a probing UE. In some embodiments, the base station may designate a Mode 3 configurable UE close to a unicast receiving UE to be a probing UE. In one embodiment, the base station 110 may designate a group of one or multiple UEs in a vicinity of the intended unicast transmission to serve as probing UEs.

In an embodiment, where a transmission by the UE 142 is a multicast transmission (e.g., platooning), the base station 110 may identify one or more probing UEs from a subset or an entire group of UEs designated as intended recipients of the multicast transmission. As an example, when a message is sent to UEs where each UE belongs to a vehicle in a platoon of vehicles, the probing UEs might be all UEs in the platoon, a leader of the platoon, and/or a tail of the platoon. If some of the intended recipients of the multicast transmission are not Mode 3 UEs, one or multiple neighboring Mode 3 UE may be selected instead.

At step 252, the base station 110 instructs the one or more probing UEs selected in step 250 to monitor the quality of the V2X communication by the UE 142 over the ITS band. In some embodiments, the base station 110 can instruct the probing UEs of their status with a configuration request message over the cellular link 150 that includes at least one of a downlink control information (DCI) message, a sidelink control information (SCI) message, a media access control (MAC) control element message, or a radio resource control (RRC) message. The configuration request message can include information for configuring each of the one or more probing UEs to transmit a feedback report indicating the quality of the V2X communication by UE 142 to the base station 110.

In some embodiments, the configuration request message can be explicit. The base station 110 may send a message to each probing UE indicating the resource(s) to probe and/or to identify the V2X transmitting UE to probe (i.e., UE 142). The configuration request message can vary depending on the selection method used in step 250 by the base station 110. As an example, the configuration request message may be addressed to a group of UEs within a given geographical zone. For instance, the configuration request message may include a set of coordinates and a radius around the coordinates identifying a geographical zone. Alternatively, an approximate geographical zone may be identified by a path-loss measurement, for example, by considering only UEs whose average signal quality is higher than a threshold. The one or more Mode 3 configurable UE(s) within that geographical zone may then be instructed to serve as probing UEs.

In some embodiments, the configuration request message can be implicit. The probing UEs may be configured to monitor a control message such as a DCI message to identify a resource grant message transmitted from the base station 110 to UE 142 (i.e., step 248). The monitoring UEs may then be configured as probing UEs for the V2X communication. The UE 142 and probing UEs may share a physical downlink control channel search space and a radio network temporary identifier (RNTI) to successfully decode the resource grant message.

The configuration request message may include a configuration indicator indicating resources to be monitored in the V2X communication and/or an identification parameter of UE 142. The configuration request message or a probing request by the base station 110 may be at least one of a downlink control information (DCI) message, a media access control (MAC) control element message, or a radio resource control (RRC) message. The base station 110 may also send a second resource grant message to the one or more probing UEs identifying available resources for transmitting a feedback report from the one or more probing UEs to the base station 110 over the cellular link 150.

At step 254, the base station 110 receives feedback report from one or more probing UEs using the resources identified in step 252. The feedback report may include a signal quality parameter having at least one of a reference signal received power (RSRP), a reference signal received quality (RSRQ), a received signal strength indication (RSSI), a signal-to-interference ratio (SIR), a signal-to-noise plus interference ratio (SINR), or a frame error rate (FER) measurement corresponding with the quality of the V2X communication. The feedback report may be communicated to the base station 110 using, for example, a physical uplink control channel (PUCCH), a physical uplink shared channel (PUSCH), or a random access channel (RACH).

The V2X communication may be a sidelink transmission in the ITS band. The quality of the sidelink transmission can be evaluated using a reference signal (RS) on a physical sidelink shared channel (PSSCH) of the sidelink connection. The feedback report can also include channel state information (CSI). In some embodiments, in order to reduce overhead, the base station 110 may receive the feedback only in response to the one or more probing UEs not receiving a message over a sidelink connection.

The feedback report can include an indicator indicating whether a message is received by the probing UEs in the V2X communication over the ITS band or whether the message received by the probing UEs in the V2X communication is sent from a base-station-scheduled UE (Mode 3) or an autonomously-scheduled UE (Mode 4). In some embodiments, the feedback report may include a quality indicator of more than one transmitting UE in separate V2X communications over the ITS band.

At step 256, the base station upon receiving the feedback report from the one or more probing UEs, may assess the quality of the transmission of UE 142 and take an appropriate action. The base station may send an updated resource grant message to UE 142 in accordance with the feedback report identifying available resources for retransmission over the V2X communication interface. The retransmission may include a subset of data transmitted by UE 142 in the original V2X communication.

Figure 10:
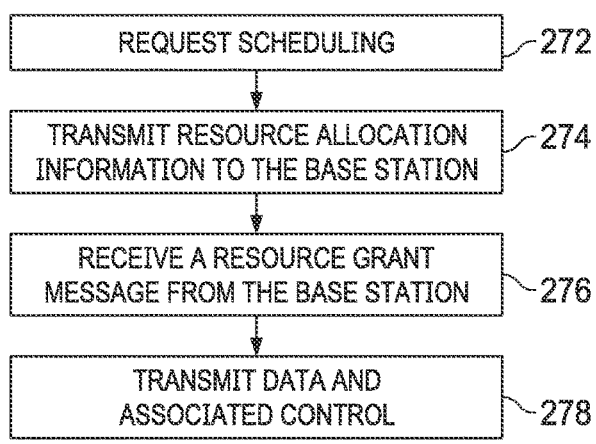
FIG. 10 is a flow chart of an embodiment method for V2X communication, as performed by a transmitting UE.

FIG. 10 illustrates a flow chart 270 of an embodiment method for receiving scheduling and for V2X communication, as performed by UE 142. The UE 142 may send a request message to the base station 110 over the cellular link 150 requesting scheduling for V2X communication over the ITS band. The UE 142 may then transmit resource allocation information to the base station 110, over the cellular link 150, identifying available resources for the V2X communication. The UE 142 receives a resource grant message from the base station 110 over the cellular link 150 identifying resources in the ITS band for V2X communication. The UE 142 communicates over the ITS band to surrounding UE(s) using resources identified by the resource grant message.

At step 272, UE 142 may transmit a schedule request to the base station 110 over the cellular link 150 to request scheduling by the base station for V2X communication in the ITS band. In the case where the data transmission by UE 142 is a periodic message, the UE 142 may request resources for periodic V2X communication.

At step 274, UE 142 transmits resource allocation information to a base station 110 over the cellular link 150. The resource allocation information identifies available and free resources in the ITS band for V2X communication. In some embodiments, step 274 may be initiated in response to a request for resource allocation information from the base station 110. UE 142 may receive a resource allocation information request message from the base station 110 and use a measurement threshold information in the request message to determine a level of availability of resources for V2X communication. In some other embodiments, step 274 may be initiated by a neighboring UE of UE 142. In one embodiment, step 274 may be initiated by UE 142 without any external request message and steps 272 and 274 may be merged. In some embodiments for purposes of limiting communication overhead, UE 142 may transmit a subset of potential candidate resources to the base station 110.

At step 276, UE 142 may receive a resource grant message from the base station 110 in response to the resource allocation message transmitted in step 274. The resource grant message is used to identify resources in the ITS band for V2X communication by UE 142. At step 278, UE 142 communicates over the ITS band using resources identified in the resource grant message.

In some embodiments, the transmission by the UE may be a sidelink data transmission. The UE 142 may transmit a sidelink control information (SCI) message on a physical sidelink control channel (PSCCH) to surrounding UEs. The UE 142 may then communicate on a physical sidelink shared channel (PSSCH) with surrounding UEs. The SCI message may include a UE scheduling information bit that identifies the scheduling type of UE 142—the scheduling type being a base station scheduled UE (Mode 3) or an autonomously scheduled UE (Mode 4). As a result, one or more probing UEs may decode each receiving communication and determine, from the UE scheduling information bit, if a scheduled transmission from a Mode 3 UE is interfered by a Mode 4 UE.

Figure 11:
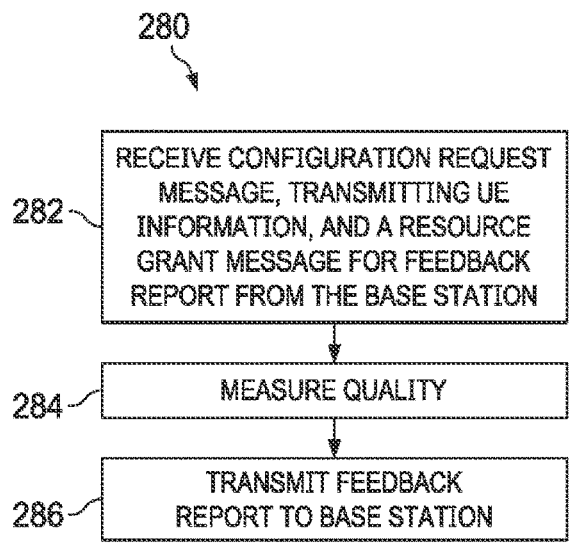
FIG. 11 is a flow chart of an embodiment method for V2X communication, as performed by one or more probing UEs.

FIG. 11 illustrates a flow chart 280 of an embodiment method for receiving a probing instruction and transmitting a feedback report in a V2X communication, as performed by one or more probing UEs. The one or more probing UEs receive an instruction from a base station 110 to serve as probing UEs. The one or more probing UEs determine the quality of a V2X communication and transmit a corresponding feedback report to the base station 110.

At step 282, the probing UE is informed by the base station 110 to monitor the quality of the V2X communication by UE 142, for example, by receiving a configuration request message. The configuration request message may include a configuration indicator that includes the probing request from the base station 110. The probing request indicates to the one or more probing UEs the resources to be monitored and/or an identification of UE 142. In some embodiments, the probing request may include at least one of a downlink control information (DCI) message, a media access control (MAC) control element message, or a radio resource control (RRC) message. In some embodiments, the probing request can include a resource grant message identifying available resources for transmitting the feedback report from the probing UE to the base station 110. In yet another embodiment, the configuration indicator can include a resource grant message identifying available resources transmitted to UE 142. The UE 142 and the probing UEs may share a physical downlink control channel search space and a radio network temporary identifier (RNTI) to successfully decode the resource grant message. In some embodiments, the probing request may include a request for a reference signal resource indicator, as explained previously, associated with a signal quality in the feedback report.

At step 284, the probing UE(s) measure the quality of the V2X communication channel by UE 142. The reference signals (RSs) used for channel measurements can be configured over the cellular link 150 (e.g., 2 GHz) in a periodic, semi-persistent, or aperiodic manner for each probing UE or for a group of probing UEs. The probing UEs may be randomly grouped by their geographical location, by the radio network temporary identifier (RNTI), or by other criteria.

The reference signals (RSs) used for channel measurements can include a channel-state information reference signal (CSI-RS), beamforming reference signals, synchronizations signals (SS) and/or SS/PBCH (physical broadcast channel) blocks. The reference signals may be configured for the entire ITS band or for a partial segment. The partial band reference signal (RS) configuration allows for more precise channel measurements in the designated partial segment. A wideband reference signal configuration such as an entire ITS band reference signal (RS) configuration allows for a large-scale characterization of the measurement channel and can be more important for semi-persistent scheduling, especially if the channel fading is flat or semi-flat across the band.

In an embodiment where the interface for V2X communication in the wireless network is a sidelink connection, the probing UEs can measure both on the physical sidelink shared channel (PSSCH) and the physical sidelink control channel (PSCCH) of the sidelink connection. As an example, the probing UEs may decode the physical sidelink control channel (PSCCH) (e.g., to get the bit indicating whether the transmitting UE uses Mode 3 or Mode 4), and/or may measure the link quality on the physical sidelink shared channel (PSSCH). The link quality may be evaluated using a demodulation reference signal (RS) in the packet to, for example, determine a reference signal received power (RSRP), a reference signal received quality (RSRQ), or a received signal strength indication (RSSI). In some embodiments, the probing UEs may attempt to decode the physical sidelink control channel (PSCCH) and determine quality metrics based on the decoding attempt and whether or not the probing UE(s) were able decode the packet. In some embodiments, distinguishing between a Mode 3 UE and a Mode 4 UE may be based on certain characteristics of the reference signals they transmit, for example, a pseudorandom seed of the reference signal.

In some embodiments, the set of resource elements (REs) allocated for reference signal (RS) transmissions can be unique for each probing UE. This allows channel and interference measurements to be made available as separate measurements. In some embodiments, multiple probing UEs located in a geographical vicinity of each other can be allocated the same resource elements (REs). This allows for a reduction in reference signal (RS) overhead while still maintaining the ability to determine the interference level and to use the measurements results in virtual sensing.

At step 286, the probing UE transmits a corresponding feedback report to the base station 110 indicating the quality of the V2X communication by UE 142. In some embodiments, the feedback report is transmitted over an uplink (UL) control channel, a physical uplink control channel (PUCCH), a physical uplink shared channel (PUSCH), or a random access channel (RACH). The feedback report can include an identification of the UE 142 and/or an indicator indicating whether a message received by the probing UE corresponds to a message sent from a base-station-scheduled UE (i.e., Mode 3) or an autonomously-scheduled UE (i.e., Mode 4).

In some embodiments, the feedback report can include a signal quality parameter that is at least one of a reference signal received power (RSRP), a reference signal received quality (RSRQ), a received signal strength indication (RSSI), a signal-to-interference ratio (SIR), a signal-to-noise plus interference ratio (SINR), or a frame error rate (FER) measurement. An index or an indicator associated with a particular reference signal, such as a CSI-RS resource indicator (CRI) or an SS/PBCH block resource indicator (SSBRI), may be included in the message that carries the sensing information. The purpose of the index or indicator may be to distinguish a particular reference signal resource in the case that multiple pre-coded reference signals use multiple resources or multiple sets of resources and precoding for reference signals transmitted on different resources or difference sets of resources may be different. Indicating a resource, in this case, may implicitly indicate a particular precoding. The said precoding may include, for example, digital precoding at the baseband and/or analog radio frequency (RF) beamforming, which may be necessary or useful especially in millimeter-wave (mmWave) systems operating, for example, at a high-frequency (HF) or in frequency range 2 (FR2).

In some embodiments, the sensing information may include a reference signal resource indicator or a set of reference signal resource indicators, but not associated signal quality values. Then, the base station may infer, for example, based on a predetermined protocol, that the indicated reference signal resources are appropriate, or inappropriate, for a new scheduling. In some embodiments, the feedback report may include a channel-state information (CSI) report and/or a beam report. The CSI/beam report may be transmitted on scheduled channels such as physical uplink control channel (PUCCH) and/or physical uplink shared channel (PUSCH) for periodic reporting. The CSI/beam report may be transmitted on a random access channel in response to a significant change to large-scale channel characteristics. The probing UEs can report a CSI and/or a beam quality through the cellular link 150 (i.e., 2 GHz link) to the base station to assist with scheduling in the ITS band. The CSI/beam report may include channel and/or interference measurements. The CSI/beam reports may be requested by the base station from all or a subset of probing UEs in accordance with the geographical location of the probing UEs. The CSI/beam report may be raw, reused, or further processed/refined, for scheduling nearby UEs.

In an embodiment where UE 142 is configured using semi-persistent scheduling (SPS), the probing UEs may transmit the feedback report after each reception of an individual message or only in response to a first reception of a message from UE 142. In some embodiments, the feedback report is transmitted in response to the probing UEs not receiving a message over the sidelink connection. The probing UE, in response to not receiving the message, may then send a feedback report with an indicator indicating that the message was not received.

Figure 12:
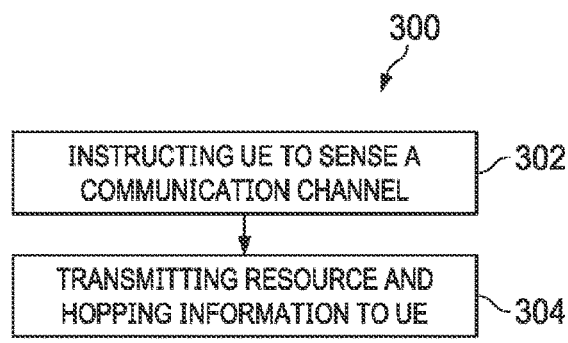
FIG. 12 is a flow chart of an embodiment method for scheduling a UE by a base station for V2X communication using pseudo-random allocation, as performed by the base station.

FIG. 12 is a flow chart 300 of an embodiment method for scheduling UE 142 for V2X communication using pseudorandom allocation, as performed by the base station 110. At step 302, the base station 110 instructs one or more Mode 3 UEs 142 to sense the V2X communication channel for Mode 4 UE 172 transmissions. The base station 110 instruction is transmitted over the cellular link 150. In response to the instruction from the base station 110, the Mode 3 UE 142 may report on the available resources and indicate a length of time during the sensing where the resources were available. In some embodiments, the report from the Mode 3 UE 142 may also include a received signal strength indicator (RSSI) in the occupied resources. In some embodiments, the report for the information of the occupied (i.e., busy) resources may be triggered by a received signal strength indicator (RSSI) threshold. The received signal strength indicator (RSSI) threshold may be used by Mode 3 UE 142 to determine the load condition—idle vs busy.

In some embodiments, the scheduling message may include, or otherwise be associated with, a beam indication for the scheduled communication. The beam indication may be performed, for example, through indicating spatial quasi-collocation (QCL) including, but not limited to, QCL Type D defined in the new radio (NR) specification. The beam indication or QCL indication may be based on the reference signal quality and/or reference signal resource indicators included in feedback reports from one or more probing UEs, geographical location and/or proximity information from UEs, and/or other information that may include spatial information.

In some embodiments, the base station 110 may also instruct one or more Mode 3 UEs 142 to sound a resource channel (i.e., send a short duration reference signal containing an identity of the transmitter) and to instruct the one or more Mode 3 UEs 142 to report the received sounding level to the base station 110. The report may also contain the identity of the senders in the channel. The sounding of the channel may be performed on idle channels determined from a previous report of Mode 3 UE 142. In some embodiments, the identity of a sounding UE may be inferred by a characteristic of reference signal from the UE such as a pseudo-random seed.

At step 304, the base station 110 sends a multicast transmission to the one or more UEs 142 with available resources indicating a pattern for transmission on the available resources determined from step 302. In some embodiments, the pattern for transmission may be deterministic. As an example, the pattern may indicate for each Mode 3 UE 142 a sequence of resources to be used for a repetitive broadcast or pseudorandom, where Mode 3 UE 142 may randomly select resources from an available pool of resources for transmission. The pattern of transmission may be selected to minimize interference between Mode 3 UE 142 and other Mode 3 UE 142 and/or Mode 4 UE 172, while maximizing resource utilization (i.e., spatial re-use). It should be noted that in a pseudorandom distribution, the possible interference from Mode 3 UE 142 is typically averaged at the potential receiving UEs 144. This advantageously improves fairness in allocating resources.

In one embodiment, hopping between resources may not be pseudorandom. As an example, in round robin hopping where each of N number of UEs are scheduled to transmit over N distinct resources. In a first round of transmissions, the first UE may transmit over the first resource, the second UE may transmit over the second resource, and so forth. In a second round of transmission, the first UE may transmit over the second resource, the second UE may transmit over the third resource and the N-th UE may transmit over the first resource. Therefore, in an i-th round of transmission, the i-th UE transmits over the k-th resource, where k is equal to the sum of i and j and subtracted by 1 over modulo N (i.e., k=(i+j−1) mod N). The allocation of resource may remain valid for all or a subset of UEs for a finite period or as long as the base station 110 instructs the UE that the allocation of resources has been terminated.

Figure 13:
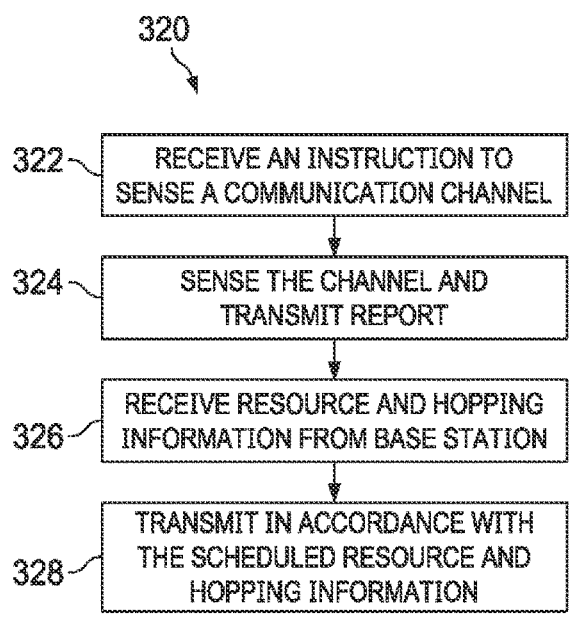
FIG. 13 is a flow chart of an embodiment method for scheduling a UE by a base station for V2X communication using pseudo-random allocation, as performed by the UE.

FIG. 13 is a flow chart 320 of an embodiment method for scheduling UE 142 for V2X communication using pseudo-random allocation, as performed by the UE 142. At step 322, Mode 3 UE 142 receives an instruction to sense the V2X communication channel for Mode 4 UE 172 transmissions. At step 324, Mode 3 UE 142 senses the V2X communication in accordance with the instructions from the base station 110 and transmits a corresponding report back to the base station 110.

At step 326, Mode 3 UE 142 receives a message from the base station 110 indicating a pattern for V2X transmission on the available resources identified by the base station 110. At step 328, Mode 3 UE 142 transmits to UE 144 a communication in accordance with the scheduled resources and hopping information of step 326.

Figure 14:
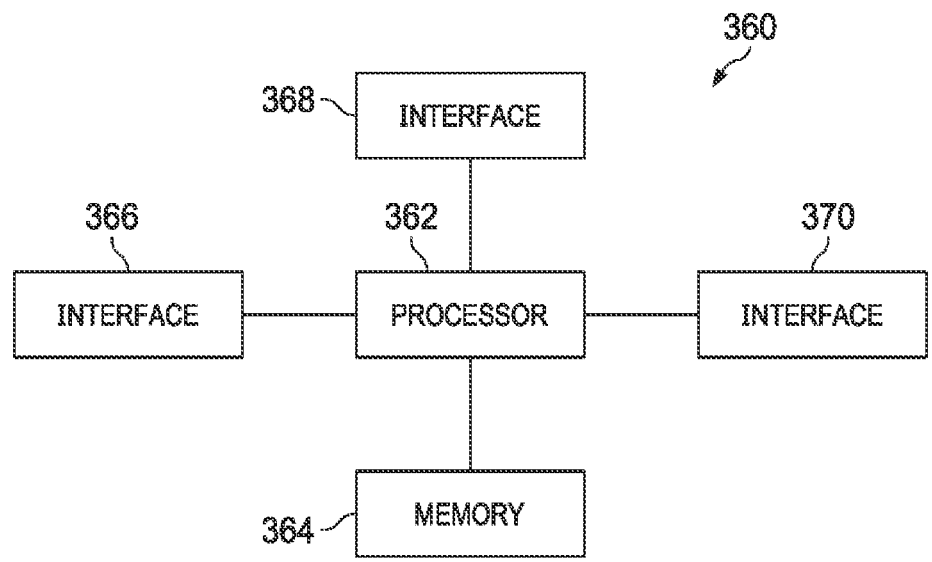
FIG. 14 is a diagram of an embodiment processing system.

FIG. 14 illustrates a block diagram of an embodiment processing system 360 for performing methods described herein, which may be installed in a host device. As shown, the processing system 360 includes a processor 362, a memory 364, and interfaces 366-368, which may (or may not) be arranged as shown in FIG. 13. The processor 362 may be any component or collection of components adapted to perform computations and/or other processing related tasks, and the memory 364 may be any component or collection of components adapted to store programming and/or instructions for execution by the processor 362. In an embodiment, the memory 364 includes a non-transitory computer readable medium. The interfaces 366, 368, 370 may be any component or collection of components that allow the processing system 360 to communicate with other devices/components and/or a user. For example, one or more of the interfaces 366, 368, 370 may be adapted to communicate data, control, or management messages from the processor 362 to applications installed on the host device and/or a remote device. As another example, one or more of the interfaces 366, 368, 370 may be adapted to allow a user or user device (e.g., personal computer (PC), etc.) to interact/communicate with the processing system 360. The processing system 360 may include additional components not depicted in FIG. 13, such as long-term storage (e.g., non-volatile memory, etc.).

In some embodiments, the processing system 360 is included in a network device that is accessing, or part otherwise of, a telecommunications network. In one example, the processing system 360 is in a network-side device in a wireless or wireline telecommunications network, such as a base station, a relay station, a scheduler, a controller, a gateway, a router, an applications server, or any other device in the telecommunications network. In other embodiments, the processing system 360 is in a user-side device accessing a wireless or wireline telecommunications network, such as a mobile station, a user equipment (UE), a personal computer (PC), a tablet, a wearable communications device (e.g., a smartwatch, etc.), a wireless capable vehicle, a wireless capable pedestrian, a wireless capable infrastructure element or any other device adapted to access a telecommunications network.

Figure 15:
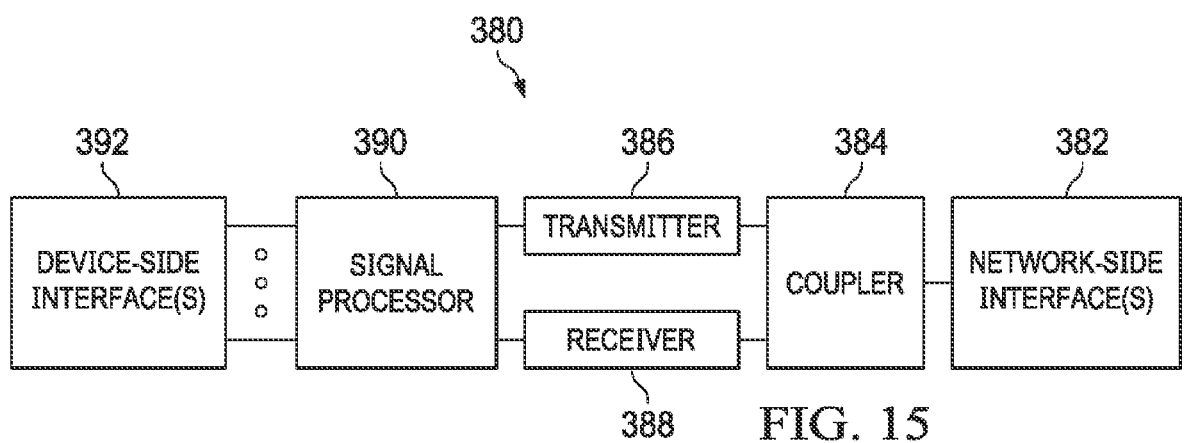
FIG. 15 is a diagram of an embodiment transceiver.

In some embodiments, one or more of the interfaces 366, 368, 370 connects the processing system 360 to a transceiver adapted to transmit and receive signaling over the telecommunications network. FIG. 15 illustrates a block diagram of a transceiver 380 adapted to transmit and receive signaling over a telecommunications network. The transceiver 380 may be installed in a host device. As shown, the transceiver 380 comprises a network-side interface 382, a coupler 384, a transmitter 386, a receiver 388, a signal processor 390, and a device-side interface 392. The network-side interface 382 may include any component or collection of components adapted to transmit or receive signaling over a wireless or wireline telecommunications network. The coupler 384 may include any component or collection of components adapted to facilitate bi-directional communication over the network-side interface 382. The transmitter 386 may include any component or collection of components (e.g., up-converter, power amplifier, etc.) adapted to convert a baseband signal into a modulated carrier signal suitable for transmission over the network-side interface 382. The receiver 388 may include any component or collection of components (e.g., down-converter, low noise amplifier, etc.) adapted to convert a carrier signal received over the network-side interface 382 into a baseband signal. The signal processor 390 may include any component or collection of components adapted to convert a baseband signal into a data signal suitable for communication over the device-side interface(s) 392, or vice-versa. The device-side interface(s) 392 may include any component or collection of components adapted to communicate data-signals between the signal processor 390 and components within the host device (e.g., the processing system 360, local area network (LAN) ports, etc.).

The transceiver 380 may transmit and receive signaling over any type of communications medium. In some embodiments, the transceiver 380 transmits and receives signaling over a wireless medium. For example, the transceiver 380 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 382 comprises one or more antenna/radiating elements. For example, the network-side interface 382 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 380 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method, comprising:
receiving, by a first user equipment (UE) from a base station, a configuration request message including a configuration indicator, the configuration indicator indicating the first UE to measure quality of a sidelink communication from a second UE on resources of a resource pool in a wireless network, wherein the sidelink communication on the resources of the resource pool is associated with one or more messages from the second UE in a physical sidelink channel; and
transmitting, by the first UE, a feedback report to the base station, the feedback report including an identification of the second UE in the wireless network and a measurement result of the sidelink communication from the second UE.

2. The method of claim 1, wherein the measurement result of the sidelink communication is evaluated using one or more of a reference signal (RS) on a physical sidelink shared channel (PSSCH) or an RS on a physical sidelink control channel (PSCCH), of the sidelink communication.

3. The method of claim 1, further comprising:
transmitting, by the first UE, the feedback report to the base station using a physical uplink control channel (PUCCH), a physical uplink shared channel (PUSCH), or a random access channel (RACH).

4. The method of claim 1, wherein the measurement result comprises a signal quality parameter, the signal quality parameter comprising at least one of a reference signal received power (RSRP), a reference signal received quality (RSRQ), a received signal strength indication (RSSI), a signal-to-interference ratio (SIR), a signal-to-noise plus interference ratio (SINR), or a frame error rate (FER) measurement.

5. The method of claim 1, wherein the configuration indicator is received from the base station and indicates sidelink resources to be monitored or the identification of the second UE to be monitored for the sidelink communication.

6. The method of claim 5, wherein the configuration indicator is included in at least one of a downlink control information (DCI) message, a media access control (MAC) control element message, or a radio resource control (RRC) message.

7. The method of claim 1, further comprising:
receiving, by the first UE, a resource grant message from the base station, the resource grant message identifying available resources for transmitting the feedback report.

8. The method of claim 1, wherein the sidelink communication from the second UE includes the identification of the second UE, the method further comprising:
receiving, by the first UE from the base station, a configuration for the resource pool.

9. The method of claim 1, wherein the resources of the resource pool for the sidelink communication from the second UE are selected by the second UE.

10. The method of claim 9, selection of the resources of the resources pool by the second UE being in accordance with an autonomous resource selection process.

11. The method of claim 1, further comprising:
receiving, by the first UE from the base station, scheduling information of the resources of the resource pool for second sidelink communication to the second UE.

12. A user equipment (UE), comprising:
at least one processor; and
a non-transitory computer readable storage medium storing programming for execution by the at least one processor, the programming including instructions to cause the UE to perform operations including:
receiving a configuration request message including a configuration indicator from a base station, the configuration indicator indicating the UE to measure quality of a sidelink communication from a second UE on resources of a resource pool in a wireless network, wherein the sidelink communication on the resources of the resource pool is associated with one or more messages from the second UE in a physical sidelink channel; and
transmit a feedback report to the base station, the feedback report including an identification of the second UE in the wireless network and a measurement result of the sidelink communication from the second UE.

13. The UE of claim 12, wherein the measurement result of the sidelink communication is evaluated using one or more of a reference signal (RS) on a physical sidelink shared channel (PSSCH) or an RS on a physical sidelink control channel (PSCCH) of the sidelink communication.

14. The UE of claim 12, the operations further comprising:
transmitting the feedback report to the base station using a physical uplink control channel (PUCCH), a physical uplink shared channel (PUSCH), or a random access channel (RACH).

15. The UE of claim 12, wherein the measurement result comprises a signal quality parameter, the signal quality parameter comprising at least one of a reference signal received power (RSRP), a reference signal received quality (RSRQ), a received signal strength indication (RSSI), a signal-to-interference ratio (SIR), a signal-to-noise plus interference ratio (SINR), or a frame error rate (FER) measurement.

16. The UE of claim 12, wherein the configuration indicator is received from the base station and indicates sidelink resources to be monitored or the identification of the second UE to be monitored for the sidelink communication.

17. The UE of claim 12, wherein the resources of the resource pool for the sidelink communication from the second UE are selected by the second UE.

18. The UE of claim 17, selection of the resources of the resources pool by the second UE being in accordance with an autonomous resource selection process.

19. The UE of claim 12, the operations further comprising:
receiving, from the base station, scheduling information of the resources of the resource pool for second sidelink communication to the second UE.

20. A non-transitory computer readable storage medium storing computer-executable instructions that, when executed by a first user equipment (UE), cause the first UE to:
receive a configuration request message including a configuration indicator from a base station, the configuration indicator indicating the first UE to measure quality of a sidelink communication from a second UE on resources of a resource pool in a wireless network, wherein the sidelink communication on the resources of the resource pool is associated with one or more messages from the second UE in a physical sidelink channel; and transmit a feedback report to the base station, the feedback report including an identification of the second UE in the wireless network and a measurement result of the sidelink communication from the second UE.

* * * * *